June 24, 1969  J. A. ROYER  3,451,431
LIQUID FLOW REGULATOR
Filed Feb. 6, 1967  Sheet 1 of 2
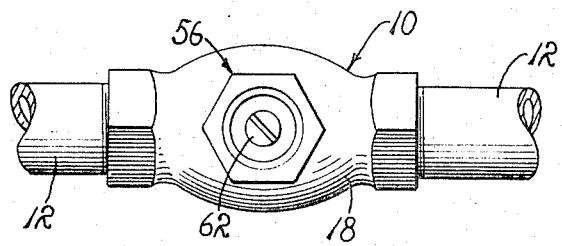
FIG. 1.
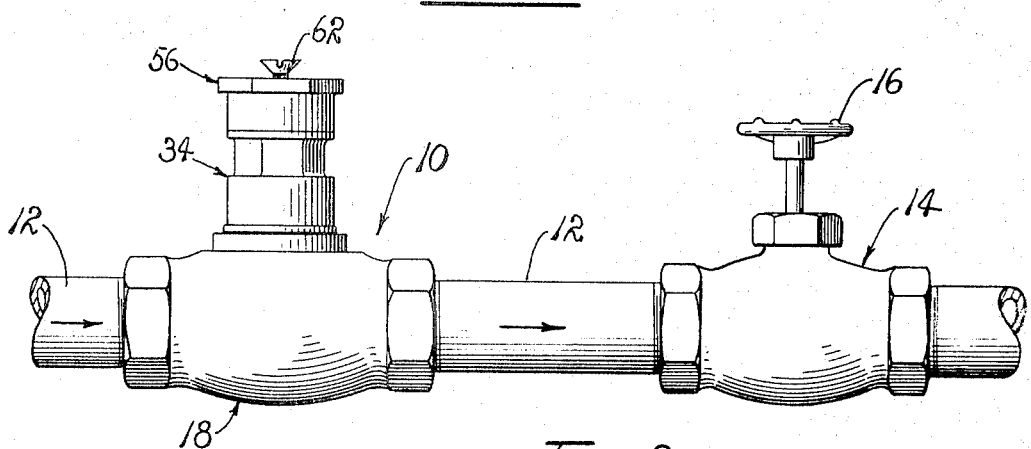
FIG. 2.
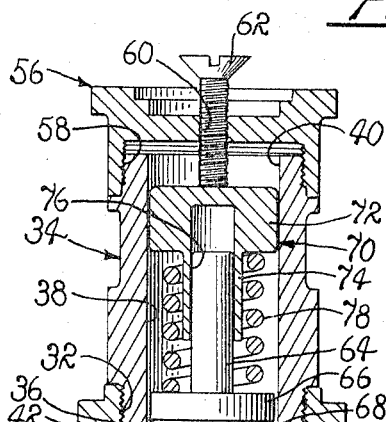
FIG. 3.
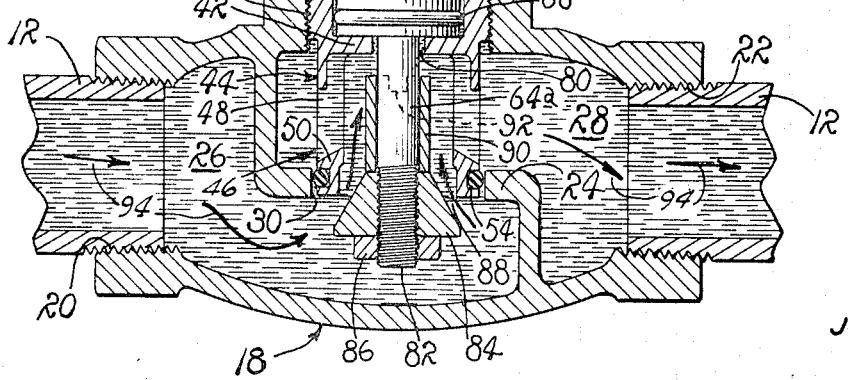
JOHN A. ROYER
INVENTOR
Haebner & Worrel
ATTORNEYS

JOHN A. ROYER
INVENTOR

United States Patent Office 3,451,431
Patented June 24, 1969

3,451,431
LIQUID FLOW REGULATOR
John A. Royer, Fresno, Calif., assignor to Buchner Industries, Inc., a corporation of California
Filed Feb. 6, 1967, Ser. No. 614,120
Int. Cl. F16k *31/12, 25/02;* F15d *1/02*
U.S. Cl. 138—46      5 Claims

ABSTRACT OF THE DISCLOSURE

Flow regulator for liquid supply lines serving one or more liquid dispensers, including an adjustable automatically operable liquid flow restricting means responsive to pressure and flow surges from a liquid supply source, to monitor and maintain a substantially even liquid flow to the dispensers.

Background of the invention

The present invention while relating generally to water flow regulating devices is more specifically concerned with flow regulators for water supply lines to which sprinklers, or other watering devices such as for irrigation, are connected and has as its primary object pressure surge control to minimize pressure and flow surges in a supply line to the sprinklers or the like.

Heretofore water sprinkler systems or the like have been subjected to pressure fluctuations resulting in water surges so that operation and control of the dispensers or sprinklers have not been uniform or as satisfactory as desired. Unevenness of flow through such sprinkler heads renders such systems difficult to regulate or maintain a substantially constant outflow of water. Under extreme conditions damage also might occur. In some existing systems attempts to maintain flow uniformity have involved manipulating control valves in the system under varying conditions of water pressure in an attempt to obtain the desired discharge from any of a plurality of sprinkler heads or other watering devices.

Summary

In accomplishing the objects and results of the invention, a normally open adjustable spring-biased liquid flow restricting valve is coupled in a liquid supply line and operates automatically to partially close under pressure surge conditions, to a degree dependent upon adjusted spring pressure, and thereby automatically and substantially immediately partially restrict liquid flow therethrough, and maintain a substantially constant flow regardless of pressure fluctuations from a liquid supply source. The structure of the valve prevents a completely closed condition so that liquid flow is continuous, even under high liquid supply pressures and surges, and in the absence thereof, the valve automatically opens to permit increased lower pressure flow therethrough. This insures a substantially even regulated liquid flow to dispensers connected to the supply source.

It is accordingly an object of the present invention to provide a flow regulator which is selectively adjustable and which serves the function of preventing pressure or water surge from affecting flow from a source of water supply to individual sprinkler heads and the like.

Another object is to provide such a flow regulator which is inexpensive and of sturdy construction with a minimum of moving parts and which also incorporates adjustment means for regulating resistance to water and pressure surges.

An additional object is to provide a flow regulator incorporating means permitting continuous water flow therethrough, and which simultaneously rejects, or tends to damp out, water surges passing through a supply line so as to preclude damage to a system in the event of a high pressure water surge, and to insure substantially even continuous flow of water to dispensing devices.

Additional objects and advantages of the invention will be more readily apparent from the following detailed description of an embodiment thereof when taken together with the accompanying drawings in which:

FIG. 1 is a top plan view of the flow regulator of the present invention;

FIG. 2 is a side elevational view of a segment of a watering or sprinkling system incorporating the flow regulator of the invention;

FIG. 3 is an enlarged vertical sectional view through the flow regulator, and a water line in which attached, with the flow regulator in an open nonflow restricting position.

Figure 4:
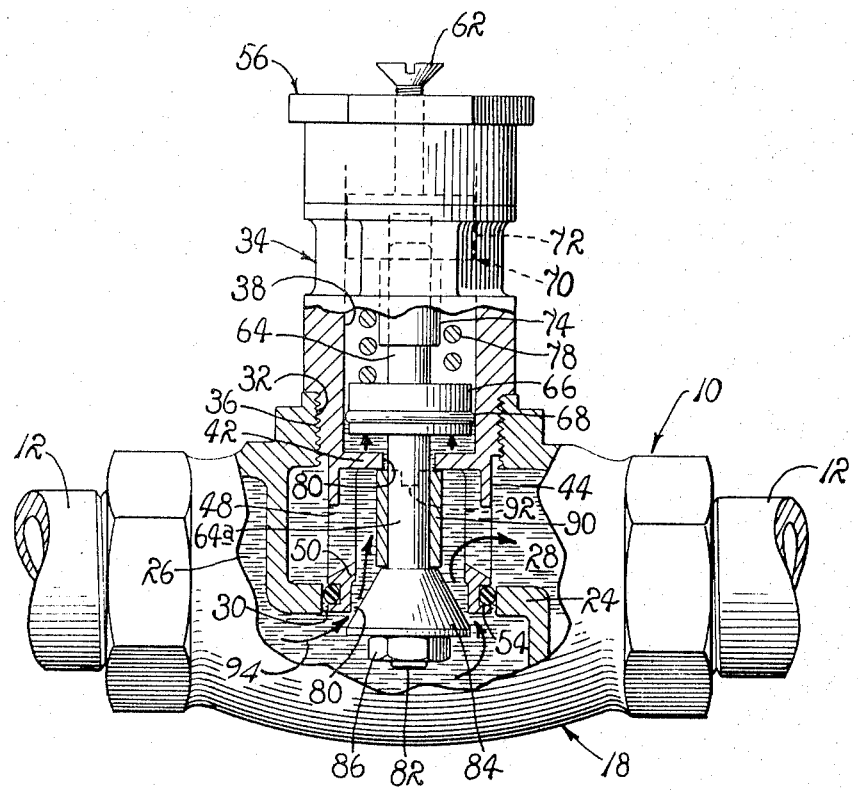
FIG. 4 is a view generally similar to FIG. 3, partly in section, with the flow regulator in a closed flow restricting position.

Referring now more specifically to the drawings, the flow regulator, generally indicated at 10, is coupled into a liquid supply system which, in the embodiment shown, is a system for suppplying water to sprinkler heads or the like. Obviously however, the flow regulator is not restricted to this specific use but has a broader general application. The liquid supply system includes, as is usual, a plurality of pipe sections 12 leading from the source of supply, not shown, to sprinkler heads or the like, not shown, as generally used for irrigation or for lawn sprinkling. In addition to the water regulator 10, a flow control valve generally designated 14 is incorporated in the system for regulating volume flow in a normal manner, and includes a handle 16 for regulating the valve and consequent water flow therethrough. Such a control valve, however, is not capable of reacting to pressure surges in such a manner as to provide a substantially even flow of liquid in and through the system. Surges of increased water pressure result in greater liquid flow through a system with a resilient unevenness of operation, and under extreme circumstances can result in possible damage or breakage of individual outlet operating components in the system. The present device is intended to obviate these difficulties and drawbacks, as will appear more clearly in the following description of the construction and operation thereof.

The flow regulator 10 includes a casing or housing 18, having an internally threaded inlet opening 20, and an internally threaded outlet opening 22, each of which are adapted for connection to externally threaded pipe sections 12 in the liquid supply system. Internally of the casing 18 a divider partition, generally designated 24, is provided which divides the interior of the casing into a liquid inlet compartment 26 and a liquid outlet compartment 28. A flow opening 30 is incorporated in the divider partition to permit controlled flow from the inlet compartment 26 to the outlet compartment 28.

The regulator includes adjustable automatically operable flow restricting means in the nature of a spring-biased valve. To this end the casing is provided with a screw-threaded top opening 32 which opens into the interior of casing 18 generally on the side of the liquid outlet compartment, as shown in FIGS. 3 and 4. A cylindrical housing 34, which is externally screw-threaded at 36, is operatively associated with internally screw-threaded opening 32 for connection with casing 18. Cylindrical housing 34 has an internal bore 38 extending therethrough from an open end 40 to an internal web or partition 42 in proximity to end 44 opposite to the open end 40. A cage is formed as an extension of cylindrical housing 34, beyond the web or partition 42, and has a plurality of peripherally arranged openings 48 for the purpose of permitting liquid flow therethrough. The cage 46 also has a peripheral ring 50 at its lower end with an external groove in which O-ring 54 is seated. The O-ring is in liquid-tight engagement with the wall of the flow opening 30 in divider partition 24.

The upper end 40 of cylindrical housing 34 is adapted to be closed by cap 56 by means of interengaging threads therein and on the upper end of housing 34, as generally indicated at 58. A screw-threaded opening 60 is provided centrally through cap 56 adapted for adjustably engaging an externally threaded member 62 in the nature of a screw or bolt, and which serves the purpose of adjusting spring pressure on a flow control valve mechanism to be described hereinafter.

The flow regulating valve mechanism, which is mounted internally of cylindrical housing 34 and casing 18, includes an elongated valve stem 64 having, intermediate the ends thereof, a circular plunger 66 which is positioned in bore 38 above the web or partition 42. The plunger 66 is adapted for engagement with the upper surface of partition 42 under certain operating conditions of the flow regulator, and the web or partition constitutes a lowermost position stop for the plunger 66, and thereby for the overall or composite regulating valve. An O-ring 68 is operatively associated with the outer periphery of the plunger 66 and engages the internal wall of bore 38 in liquid-sealing engagement therewith.

A spring follower 70 has a circular head 72 which is in loose sliding engagement with the interior of bore 38. A spring follower extension 74 projects from circular head 72 downwardly within the bore 38. The interior of the extension 74 is hollow and provides a valve stem guide 76 therein, in which the upper end of valve stem 64 is slidably interengaged. A compression spring 78 is interposed between the under surface of circular head 72 and the upper surface of circular plunger 66. A lower stop position for plunger 66 is defined by the web or partition 42 and the plunger is maintained under some operating conditions in downwardly spring-biased position by means of spring 78. Adjustment of the spring force is effected by adjusting the threaded member 62 with respect to the cap 56. The member 62 engages with the upper surface of the circular head 72 in a manner clearly shown in FIGS. 3 and 4 of the drawings.

The valve stem 64 includes a lower portion 64a, below plunger 66, which extends into casing 18 through an opening 80 in web or partition 42. Valve stem portion 64a has a loose fit in opening 80 to permit liquid passage between the valve stem and the opening. The lowermost end 82 of the valve stem is screw threaded and has a frustoconical valve member 84 in screw-threaded engagement thereon. A lock nut 86 is provided to lock valve member 84 on the valve stem. An orifice 88 is formed by the inner periphery of ring 50 and serves as a loose fitting valve seat for valve head 84, the fit being such as not to preclude liquid passage therebetween, but of sufficiently close tolerances and fit to permit controlled restricted flow therethrough, depending upon relative positioning of valve head 84 with respect to orifice 88.

A spacer sleeve 90 is in slidable loose fitting engagement on valve stem portion 64a, between the upper face of valve head 84 and the lower face of web or partition 42. Diametrically opposed slots 92 are formed at the upper end of spacer sleeve 90 to provide liquid flow passages from the interior of liquid outlet compartment 28, to opening 80 in web or partition 42, regardless of the position of valve head 84 with respect to orifice 88, and consequently the position of sleeve 90. The passages serve the purpose of permitting liquid under line pressure to contact the under surface of circular plunger 66 at all times. Arrows 94 in FIGS. 3 and 4 indicate the flow pattern of liquid entering casing 18: between valve head 84 and ring 50 through orifice 88, through opening 80 against the under surface of plunger 66, and outwardly through outlet compartment 28 into the succeeding pipe section 12, for subsequent flow to and through dispenser devices, such as sprinkler heads and the like, not shown.

The function and operation of the flow regulator will be readily understood from a comparison of FIGS. 3 and 4 of the drawings. Tension of the spring 78 is initially adjusted by manipulation of the screw-threaded member 62 through engagement with the upper surface of circular head 72 of spring follower 70, with the lower surface of the head 72 tending to compress the spring therebetween and the upper surface of plunger 66. Under no flow conditions, since the plunger 66 is integral with valve stem 64, the lower surface of plunger 66 will engage with the upper surface of web or partition 42 which serves as a stop abutment therefor. When liquid is flowing from the source of supply through a pipe section 12 into the inlet compartment 26, and is within a normal predetermined low range of pressures, the spring 78 will continue to maintain the plunger 66 and, therefore, head 84 in the position shown in FIG. 3. This creates a flow passage through orifice 88, and then through cage openings 48 to the exterior of casing 18 for a normal predetermined amount of flow to the utilizing mechanisms.

As set forth hereinabove, this flow opening is regulatable by adjusting the spring tension or force. When a pressure surge or a rapid increase of liquid pressure occurs in the system and, therefore, in liquid inlet compartment 26, the water flow and resultant pressure thereof passes through opening 80 and acts against the under surface of plunger 66, in opposition to the spring pressure against the upper surface of plunger 66, thereupon raising plunger 66 and valve head 84 to a position shown in FIG. 4. A restricted flow path through orifice 88 results, although continued flow is not precluded due to the dimensional and spatial relationships of the valve head and orifice. The closer positioning of these members, however, governed by change of relationship between water pressure and spring pressure, restricts flow passage of the liquid from the inlet compartment 26 to outlet compartment 28, and is automatically controlled by the spring pressure which is preset with respect to plunger 66. Variations in water pressure rapidly react upon plunger 66, thereby to rapidly decrease the flow dimensions of orifice 88, while not completely restricting flow therethrough.

Even in the uppermost position of the valve head 84, which is controlled by the dimensions of, and engagement with, spacer sleeve 90, flow passage to the under surface of plunger 66 is not prevented due to the provision of the slots 92 in the spacer. This insures continued pressure action against the under surface of plunger 66, through opening 80, to maintain it in the position shown in FIG. 4 under high pressure conditions. The plunger, spaced from and above the upper surface of web or partition 42, maintains the valve structure of the flow regulator in flow restricting position until the incoming water pressure decreases, whereupon spring pressure will again lower the flow restricting valve mechanism to the position shown in FIG. 3. Since flow amount of a liquid is at least in part governed by liquid pressure in a closed system, it is apparent that the present device quickly reacts to variations in liquid pressure, to thereupon control the amount of liquid flowing through the flow regulator of the invention, and any perceptible pressure fluctuations or surges will be dampened to insure a substantially even flow of liquid to utilizing mechanisms such as sprinkler heads.

Having described my invention, what I claim as new and desire to secure by Letters Patent is:

1. A liquid flow regulator comprising a casing, a partition in said casing dividing the casing into liquid inlet and liquid outlet compartments, the partition having an opening therethrough, a hollow cylindrical valve housing connected to the casing and extending into the outlet compartment, a dividing web in the housing having a bore therethrough, valve means slidably mounted in the housing including a valve stem in the housing slidably extending through the bore in the web, a valve head on the valve stem on one side of its web, a circular plunger on the valve stem intermediate the ends thereof and positioned on the opposite side of the web from the valve head, a circular valve seat on an end of the housing positioned in said opening in the partition, the valve head being operatively associated with the valve seat for positioning relative thereto to obtain a predetermined flow condition, spring means operatively associated with a first side of the plunger remote from the valve head for biasing the valve head to a predetermined flow condition position, the valve stem and the bore in the dividing web being respectively so dimensioned as to provide a fluid passageway therebetween adapted to permit liquid flow therethrough from the liquid outlet compartment for impingement upon a second side of the plunger opposed to that in contact with the spring means, and a valve head spacer sleeve slidably mounted on said stem between said valve head and the near surface of said dividing web, said spacer sleeve defining a limit stop of movement of said valve head in a flow restricting direction with respect to said valve seat, said sleeve having slots in the end thereof in proximity to said dividing web to permit continued liquid flow theerthrough and into and through said partition opening when said sleeve is in a position in engagement with the near surface of said dividing web to insure liquid flow under all operating conditions to the said second side of said plunger.

2. A liquid flow regulator as claimed in claim 1, said valve head having a truncated conical shape with the smaller end thereof positioned adjacent to said valve seat, said valve stem upon movement due to liquid pressure on said second side of said plunger moving said valve head into an operative associated position with respect to said valve seat dependent upon amount of liquid pressure acting on said second plunger side in opposition to the force of said spring.

3. A liquid flow regulator as claimed in claim 2, a spring follower slidably contained in said valve means housing, and in contact with an end of said spring opposite to the end thereof in contact with said plunger, closure means for said valve means housing, and spring tension adjusting means extending through said closure means and in adjustable contact with said spring follower and operable upon adjustment to adjust spring force on said plunger.

4. A liquid flow regulator as claimed in claim 3, a spring follower extension on said spring follower, said spring follower extension having a valve stem guide bore therein adapted for slidably engaging and guiding an end of said valve stem contained within said valve means housing.

5. A liquid flow regulator comprising a casing having a liquid inlet and a liquid outlet, an internal partition in said casing dividing said casing into a liquid inlet compartment and a liquid outlet compartment, a liquid flow opening in said partition intercommunicating the opposite sides thereof with said compartments, a housing with a web having an aperture therein in communication with said liquid outlet compartment, flow restricting means including a plunger slidably mounted in the housing and carrying a valve stem extending through said aperture and liquid flow opening into each said compartment, a valve head on said stem in said inlet compartment adapted for partial flow restricting coaction with said flow opening, said valve stem having an exterior diameter smaller than the dimensions of said aperture and flow opening to thereby provide liquid flow passages therethrough, adjustable force spring means associated with one face of said plunger biasing the plunger to engage the other face thereof with said web and place said valve head in a predetermined open position with respect to said flow opening, liquid entering said inlet compartment through said inlet passing through said flow opening and aperture with the pressure thereof acting on said other face of said plunger in opposition to the spring force in direct proportion to increased pressure of liquid entering said casing, to thereby move said stem in a direction to proportionately move said valve head into closer proximity to said flow opening to restrict liquid flow therebetween dependent on changes in liquid inlet pressure into said casing.

References Cited
UNITED STATES PATENTS

| | | | |
|---|---|---|---|
| 129,015 | 7/1872 | Fay | 137—505.35 |
| 208,961 | 10/1878 | Crosby | 137—454.5 |
| 383,877 | 6/1888 | Gale. | |
| 1,945,834 | 2/1934 | Terry | 137—454.5 |
| 2,934,409 | 4/1960 | Chapou | 137—454.5 XR |
| 3,064,670 | 11/1962 | Peras | 137—505.34 XR |

HAROLD W. WEAKLEY, *Primary Examiner.*

U.S. Cl. X.R.

137—454.5, 505.35